July 27, 1943.  H. WESTERKAMP  2,325,563
FILM CONTAINER FOR ENDLESS FILMS
Filed Aug. 6, 1940
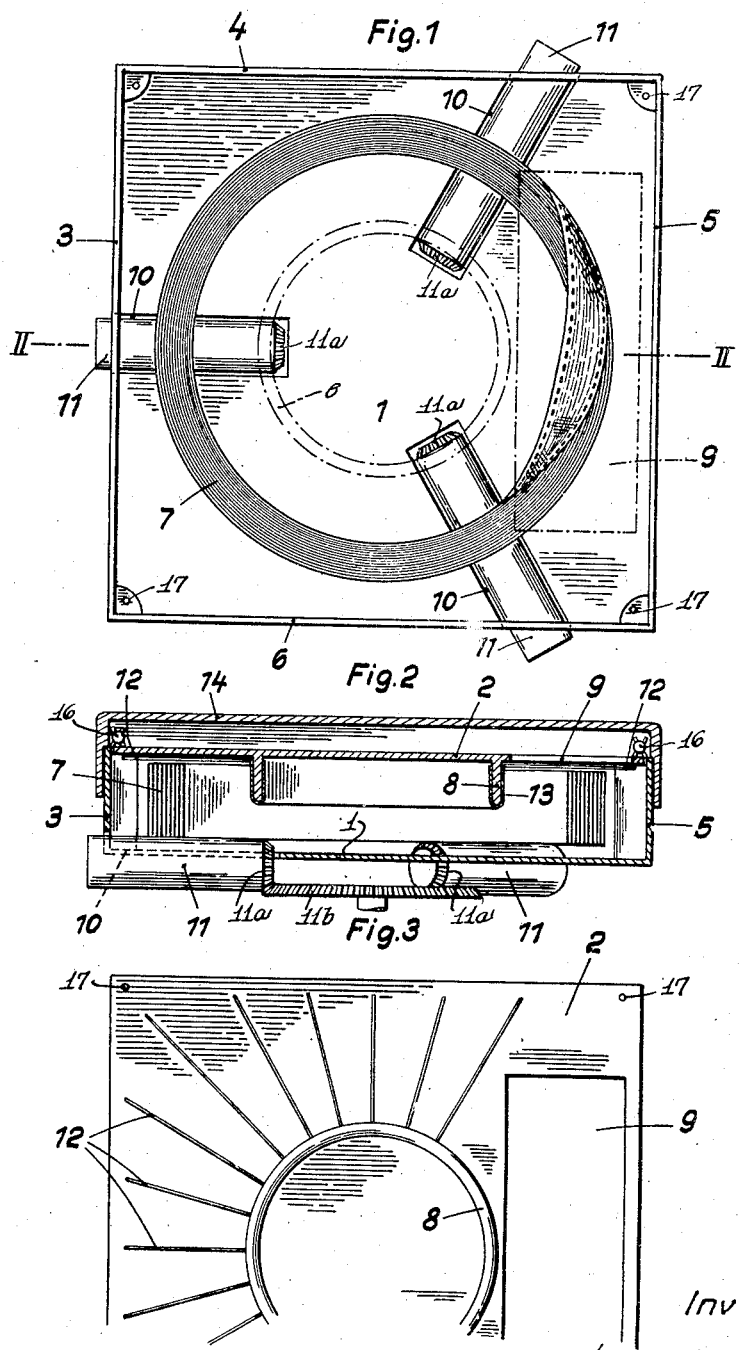
Inventor:
Hugo Westerkamp
By: Mason & Porter
Attorneys

UNITED STATES PATENT OFFICE 2,325,563

FILM CONTAINER FOR ENDLESS FILMS

Hugo Westerkamp, Cologne-Braunsfeld, Germany; vested in the Alien Property Custodian Application August 6, 1940, Serial No. 351,561
In Germany October 6, 1939

8 Claims. (Cl. 88—18.7)

The invention relates to a film container for endless films, particularly to a film container for endless sound films with mechanical sound record on one or both sides or for unrecorded endless sound films.

Inserting endless film coils into, for example, a sound recording or projecting apparatus, and removing these film coils from such an apparatus requires some skill; if the film coil happens to slip out of the hand of the operator, the film coil will lose its form, and it is very difficult for unskilled persons to restore the correct form of the film coil. For this reason, film containers have been proposed which enclose the film coil and only leave the film loop free. These film containers comprise either a film plate mounted inside the film container or another kind of bearing, for example a roller bearing for the film coil, and are, therefore, expensive in manufacture.

The object of the invention is to provide an exceedingly cheap film container, particularly a container in which the film coil is not interchangeable, which is therefore also suitable for hiring out films, as it does not permit undesired manipulations with the film or exchanging with another film by the person hiring out the film.

This is achieved according to the invention by providing the lower wall of an inaccessible chamber of the film container serving to receive the film coil with openings for the passage of elements supporting or driving the film coil in the operating position of the film container, and by giving the film chamber of the container a height which exceeds the width of the film at least to the extent required by the supporting or driving elements when extending into the film container. Therefore, according to the invention, the supporting or driving elements of the film coil are transferred from the inside of the film container to the recording or projecting apparatus, so that it is not necessary to provide each film container with these elements, and an arrangement of the elements once made, for example in a sound recording or reproducing apparatus, will serve for all film containers used in such an apparatus. When inserting the film container in the recording or reproducing apparatus, the film coil is lifted off the bottom of the film container and is properly supported by the supporting or driving elements entering at the bottom of the film container; while being driven, the film container, therefore, does not support the film coil, but the latter is supported by the elements of the recording or reproducing apparatus passing through the bottom of the film container.

The openings for the supporting or driving elements of the film coil are preferably so dimensioned that rollers disposed radially to the film coil extend entirely or partly into the film container when the latter is in the operating position.

The invention furthermore provides in the upper wall of the film container a central guide for limiting the inward motion of the film coil. Preferably, this guide is formed by a ring arranged at the lower side of the upper wall of the film chamber, this ring preventing the film coil from being contracted too much or laterally shifted.

According to a further feature of the invention, the slotted openings in the lower wall of the film container extend towards the centre of the film container up to below the central guide of the upper wall of the film chamber and towards the outer side of the film container up to its side wall and through the latter for receiving correspondingly long supporting or driving rollers. These long rollers, on which the film coil rests in operation, in conjunction with the central guide at the upper wall of the film container, prevent an undesired slipping of individual layers of the film coil towards the centre of the film container, and in conjection with the side wall of the film container a likewise undesired slipping of individual layers of the film roll in outward direction is prevented.

A film container according to the invention will only serve the purpose in a perfect manner, if it consists of a very cheap material and if it has a low weight. Therefore, cheap moulding materials of low weight, for example materials on a cellulose basis, are suitable for the construction of these film containers. However, these substances have the disadvantage that they are not very strong, and if the film should happen to touch them, a high friction is caused which will prevent the film from running smoothly. Therefore, according to the invention, portions of the film container with which the film may come into contact in operation, are provided with a metallic coating or with a metal plate, for example by embedding metallic guides, such as wires or the like, at the lower side of the upper wall of the film container, and by providing the central guide of the upper wall of the film container with a thin metal leaf.

A constructional example of a film container according to the invention is illustrated in the accompanying drawing, in which:

Fig. 1 is a plan view of the film container with removed upper wall of the space for the film coil.

Fig. 2 is a sectional view of the film container on the line II—II of Fig. 1.

Fig. 3 is a plan view of the lower side of the upper wall of the space for the film coil in the film container.

The film container consists of a chamber closed on all sides by the lower wall 1, the upper wall 2, and the side walls 3, 4, 5 and 6. The walls of this chamber are made of a cheap moulding material of light weight, for example of moulding material on a cellulose basis. The chamber enclosed by the walls 1 to 6 serves to receive the film coil 7.

The upper wall 2 of the film container is provided with a central guide 8 for the film coil 7. In the constructional example illustrated, this central guide consists of a ring formed in casting the wall 2 and extending from above into the film coil. Furthermore, the upper wall 2 has radially outside or beyond the central guide an opening 9 to provide access to and for leading the loop of the film coil out of the film container.

The lower wall 1 of the film container is provided with slots 10 in radial direction to the film coil, which slots extend towards the centre of the film container up to below the central guide 8 and towards the outside of the film container up to its side wall and through the latter. The slots 10 are so dimensioned that, when the film container is inserted in the recording or reproducing apparatus, the rollers 11 provided in this apparatus can pass through the slots and can entirely or partly enter the film chamber of the container. In doing so, the rollers lift the film coil, which before was resting on the lower wall 1 of the film container, off this wall so that the film coil is now supported by the rollers 11. A common drive is suitably provided for the rollers, illustrated as comprising bevel gears 11a on the rollers and a driving bevel gear 11b which meshes therewith and by the rotation of the rollers the film coil is turned.

At the lower side of the upper wall 2 of the film container, between the central guide 8 and the side walls of the film chamber, there are embedded metal wires 12 projecting a little beyond the surface of the wall. The guide ring 8 is provided with a thin metal covering 13 consisting, for example, of a pasted-on metal foil. The upper wall 2 of the film container is connected, preferably by seals 16 passing through holes 17 so that it cannot be taken off, to the portion 1, 3, 4, 5, 6 of the film container, suitably consisting of one piece, so that a film coil once placed in the film chamber cannot be taken out or exchanged by another film coil. A cover 14 closes the film container and protects the film loop against being damaged.

In the operating position of the film container, the film coil 7 rests on the rollers 11 and is turned by the latter. The length of the rollers in conjunction with the central guide 8 and the side walls of the film container prevent the inner or outer layers of the film coil from slipping off the rollers. If, in operation, individual film layers should happen to move in upward or downward direction, they will come into contact with the metal wire insertions 12 or with the metal covering 13 of the central guide 8. Thus, an undesired high friction of the film coil and damaging of the film container are prevented.

I claim:

1. A removable film container for permanently holding a coil of endless film, comprising upper and lower end walls and peripheral walls, said walls being fixedly connected to provide a closed container for the coil of film, the upper end wall being apertured for exposing a portion of the inner and outer turns of the coil and for permitting access to the film loop connecting said turns, the lower end wall having openings for the passage of elements for supporting and driving the film coil when in operating position, the space between said end walls being greater than the width of the film by at least the amount to which the said elements extend into the film container whereby the said elements support the coil above said lower wall when the parts are in operating position.

2. A removable film container as in claim 1, in which the openings are slots extending radially with respect to the axis of the film coil for receiving said elements in the form of rollers.

3. A removable film container as in claim 1, in which the upper end wall has a central guide extending downwardly into the coil film for limiting the inward movement of the film coil.

4. A removable film container for permanently holding a coil of endless film having its inner and outer turns connected by a film loop, comprising upper and lower end walls and peripheral walls, said walls being fixedly connected to provide a closed container for the coil of film, the upper wall having a central circular guide extending downwardly into the coil of film for limiting the radial movement thereof, said upper wall having an aperture between the guide and the peripheral wall structure for affording access to the film loop, the lower end wall having slots extending radially with respect to the axis of the film coil from the said peripheral walls to points below the central guide.

5. A film container for permanently holding a coil of endless film comprising upper and lower end walls and peripheral walls, said walls being fixedly connected to provide a closed container for the coil of film, the upper end wall being formed of plastic material and having wire-like metallic guides embedded in its upper surface for contacting the upper edges of the film coil, said upper end wall having a central guide of essentially circular form extending downwardly into the coil of film and a thin metal lining on the outer surface of said central guide for contacting the film upon inward movement thereof.

6. A film container for permanently holding a coil of endless film comprising upper and lower end walls and peripheral walls, said walls being fixedly connected to provide a closed container for the coil of film, the upper end wall having a central guide extending downwardly into the coil of film and also having an opening radially outside of said central guide for providing access to the film loop, the lower end wall having openings for the passage of elements for supporting and driving the film coil when in operating position, the space between said end walls being greater than the width of the film by at least the amount to which the said elements extend into the film container whereby the said elements support the coil above said lower wall when the parts are in operating position.

7. In a removable film container for permanently receiving a coil of endless film in combination with a drive therefor, the film container comprising upper and lower end walls and peripheral walls, said walls being fixedly connected together, the lower end wall having radial slots, the upper end wall having a fixed central guide of essentially circular form extending downwardly into the coil of film and extending radially past the inner ends of said slots, driving rollers having their upper surfaces located in said slots and above the level of the lower end wall thereby to support the coil of film out of contact with said lower wall, the end walls being permanently spaced so that the coil of film is maintained by the rollers essentially free of engagement with either end wall, said upper wall having an aperture between the guide and the peripheral wall structure for affording access to the film loop, and a common drive means for rotating said rollers to effect rotation of the coil of film about its axis.

8. A removable film container for permanently enclosing a coil of endless film and consisting entirely of fixed parts comprising upper and lower end walls and peripheral walls, said walls being fixedly connected together, the upper wall having an opening through which the film loop is accessible and also having a fixed central guide extending into the coil radially inside of the said opening, said lower wall having radial slots through which supporting rollers may pass when the container is in operating position whereby to hold the coil away from the said lower wall, the inner ends of said slots being spaced at a lesser radial distance from the axis of the coil than the radial distance of said central guide.

HUGO WESTERKAMP.